United States Patent
Frey

(10) Patent No.: US 11,447,109 B2
(45) Date of Patent: Sep. 20, 2022

(54) CONTROL METHOD FOR AN ELECTRICAL BRAKING SYSTEM AND ELECTRICAL BRAKING SYSTEM FOR AIRCRAFT

(71) Applicant: SAFRAN LANDING SYSTEMS, Velizy-Villacoublay (FR)

(72) Inventor: Olivier Frey, Velizy-Villacoublay (FR)

(73) Assignee: SAFRAN LANDING SYSTEMS, Velizy-Villacoublay (FR)

(*) Notice: Subject to any disclaimer, the term of this patent is extended or adjusted under 35 U.S.C. 154(b) by 245 days.

(21) Appl. No.: 16/867,114

(22) Filed: May 5, 2020

(65) Prior Publication Data
US 2020/0353906 A1 Nov. 12, 2020

(30) Foreign Application Priority Data

May 6, 2019 (FR) .................................... 1904730

(51) Int. Cl.
*B60T 7/10* (2006.01)
*B60T 8/17* (2006.01)
(Continued)

(52) U.S. Cl.
CPC ............ *B60T 8/1703* (2013.01); *B64C 25/44* (2013.01); *F16D 55/36* (2013.01); *F16D 65/186* (2013.01); *H02P 3/025* (2013.01); *F16D 2121/24* (2013.01)

(58) Field of Classification Search
CPC .......... B60T 8/17; B60T 8/172; B60T 8/1703; B60T 13/46; F16D 55/36; F16D 55/226;
(Continued)

(56) References Cited

U.S. PATENT DOCUMENTS 7,467,692 B2 * 12/2008 Ether .................... B60T 8/1703
188/158
8,305,024 B2 * 11/2012 Unsworth ................. H02P 1/26
318/519
(Continued)

FOREIGN PATENT DOCUMENTS

EP 2 312 721 A1 4/2011
EP 2 544 931 A1 1/2013
(Continued)

OTHER PUBLICATIONS

Search Report as issued in French Patent Application No. 1904730, dated Jan. 14, 2020.

*Primary Examiner* — Christopher P Schwartz
(74) *Attorney, Agent, or Firm* — Pillsbury Winthrop Shaw Pittman LLP

(57) ABSTRACT

A control method of an electrical braking system for aircraft includes a plurality of electromechanical actuators capable of applying a braking force on friction members. Each electromechanical actuator includes an electric motor equipped with one or more windings. The braking system further includes at least one power module configured to send to each electric motor winding a phase current and at least one control module configured to control, in response to a braking setpoint, the sending by the power module of a setpoint phase current determined depending on the braking force to be applied. The method further includes the variation of the phase current transmitted to each winding of the electric motor so as to cause the phase current to oscillate around the setpoint phase current.

10 Claims, 3 Drawing Sheets

(51) Int. Cl.
  *B64C 25/44* (2006.01)
  *F16D 55/36* (2006.01)
  *F16D 65/18* (2006.01)
  *H02P 3/02* (2006.01)
  *F16D 121/24* (2012.01)

(58) Field of Classification Search
  CPC .. H02P 6/006; H02P 6/08; H02P 27/02; H02P 27/04
  USPC ..................................... 188/1.11 E, 156–164
  See application file for complete search history.

(56) References Cited

U.S. PATENT DOCUMENTS

| | | | | |
|---|---|---|---|---|
| 10,479,341 | B2* | 11/2019 | Masuda | .................... H02K 7/14 |
| 10,654,455 | B2* | 5/2020 | Masuda | ................... H02P 21/09 |
| 10,807,577 | B2* | 10/2020 | Masuda | .................. B60T 8/172 |
| 10,958,195 | B2* | 3/2021 | Nomura | .................... H02P 6/16 |
| 2020/0307531 | A1* | 10/2020 | Richard | ................ B60T 13/746 |

FOREIGN PATENT DOCUMENTS

| | | | |
|---|---|---|---|
| EP | | 3 176 083 A1 | 6/2017 |
| WO | WO 2011/110363 A1 | | 9/2011 |

\* cited by examiner

[Fig. 1]
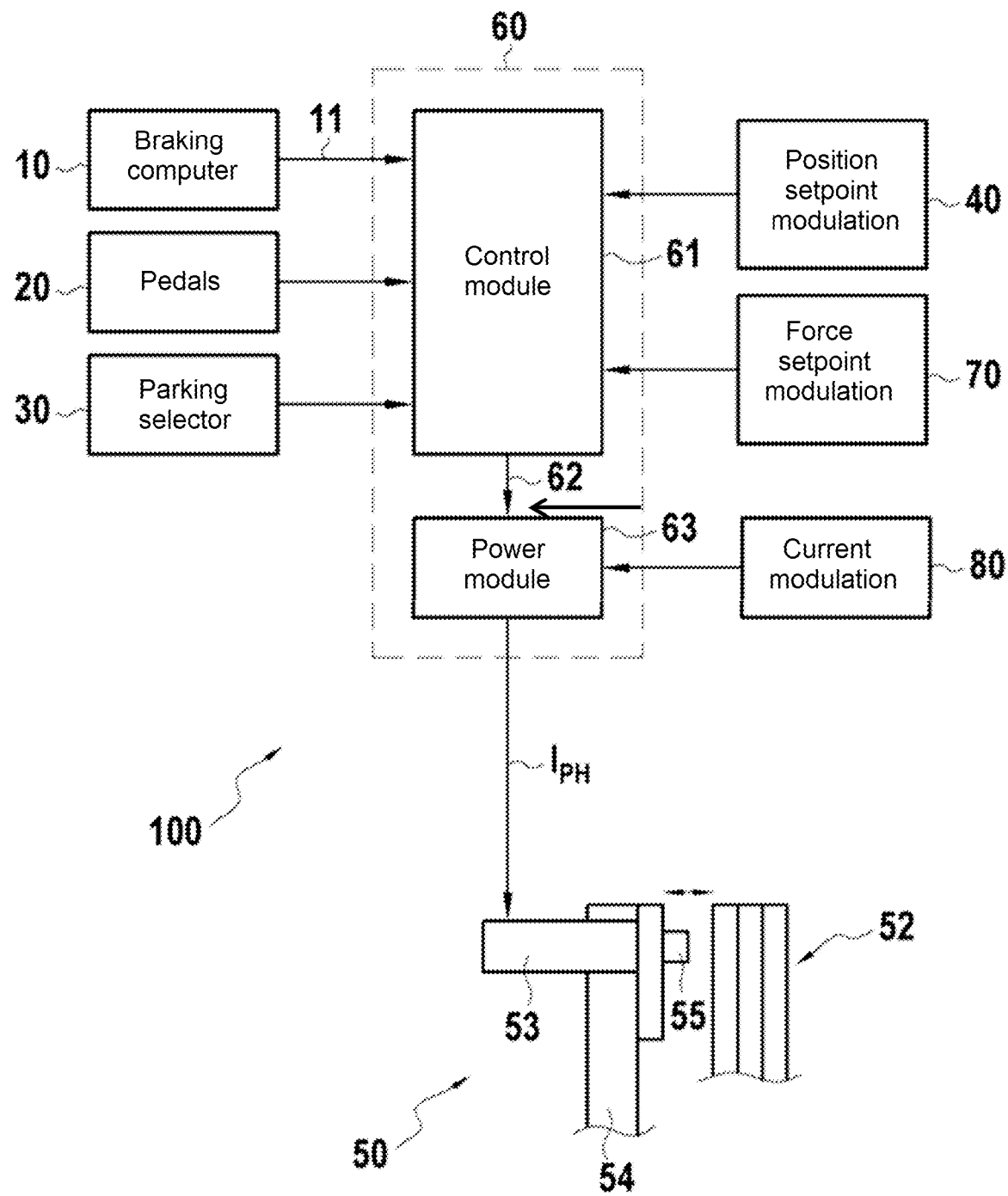

[Fig. 2]
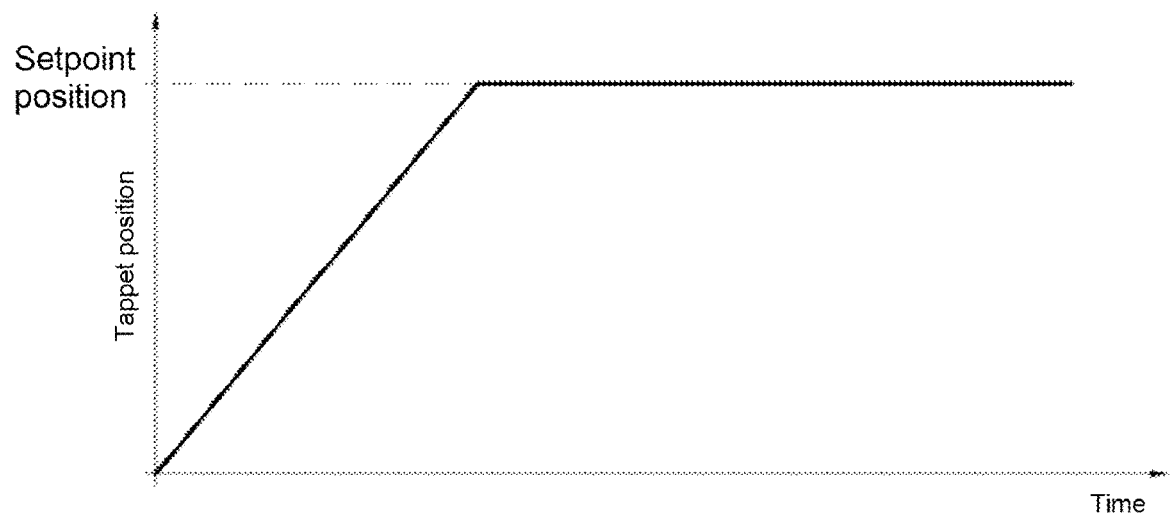
[Fig. 3]
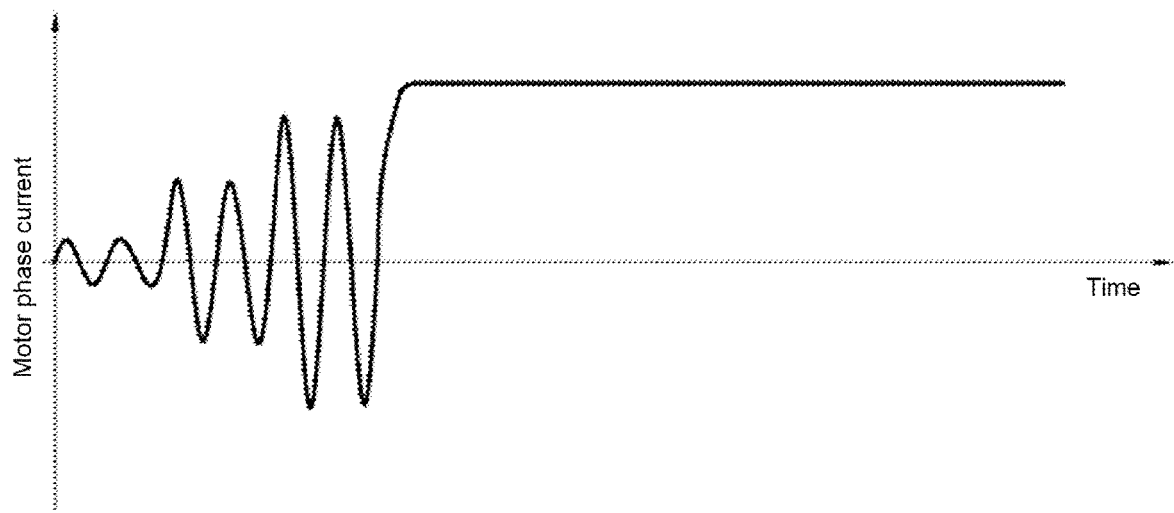

[Fig. 4]
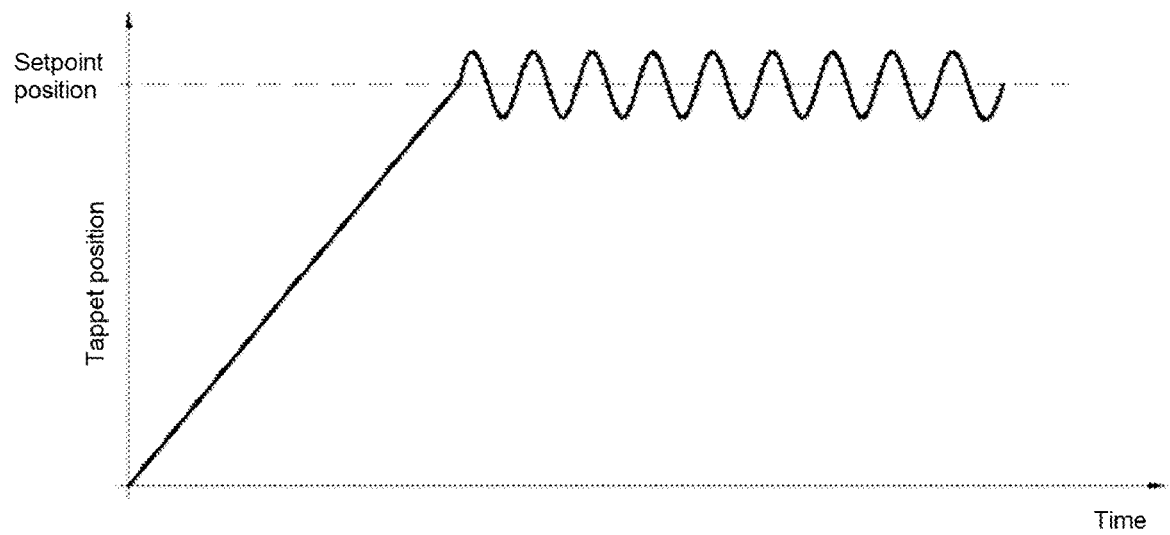
[Fig. 5]
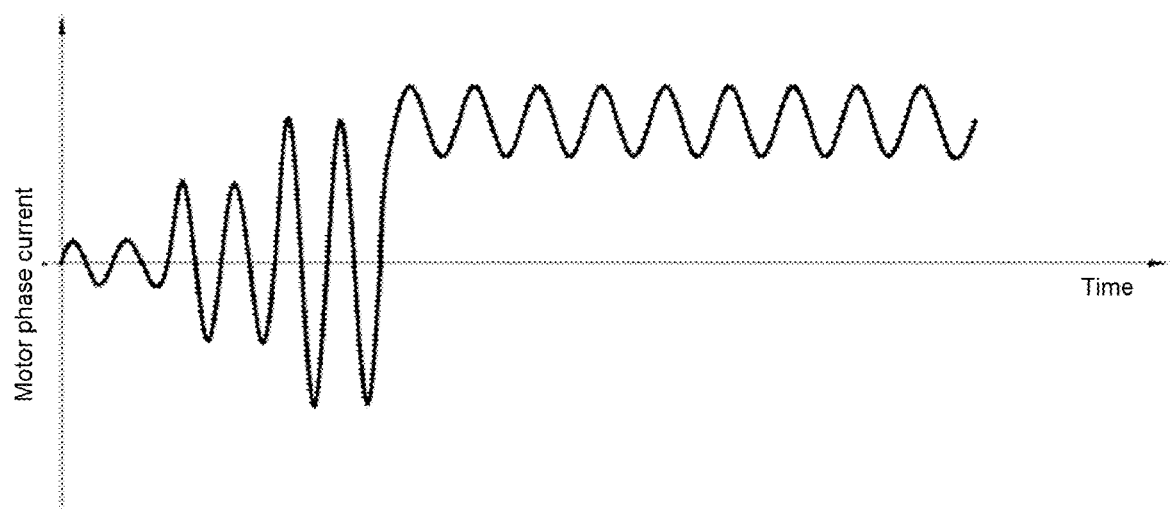

CONTROL METHOD FOR AN ELECTRICAL BRAKING SYSTEM AND ELECTRICAL BRAKING SYSTEM FOR AIRCRAFT

CROSS-REFERENCE TO RELATED APPLICATIONS

This application claims priority to French Patent Application No. 1904730, filed May 6, 2019, the entire content of which is incorporated herein by reference in its entirety.

FIELD

The present invention relates to the field of electrical braking in aircraft.

BACKGROUND

An electrical braking system for aircraft comprises, in particular, electromechanical brake actuators (EMA) which selectively apply a braking force on friction members to exert a braking torque on the respective wheels. The electromechanical actuator consists mainly of an electric motor and a mechanical transmission in which one element in translation constitutes a tappet allowing the application of a pressing force on the friction members and the generation of the braking torque. A braking system of this type is in particular disclosed in document EP 2 544 931.

During the accomplishment of braking, an electrical control is sent to the electric motor to put it into motion, to cause the tappet to slide toward the friction members and to apply the pressing force.

In certain operating situations, the electric motor is made to retain a fixed position to apply a constant force on the friction members, reflected in an absence of rotation of the motor. In these situations, the motor is supplied with electrical power to apply and maintain the setpoint force by means of the application of a motor torque. In this case, the winding(s) constituting the electric motor can be supplied continuously with a high motor current for a long duration, with as its consequence a heating of the windings due to Joule effect losses. In order to avoid this heating leading to degradation or destruction of the windings, one solution consists of over-dimensioning them during the design of the electric motor. However, this over-dimensioning has a significant impact on the mass and the bulk of the braking system.

Consequently, there exists a need for allowing a motor of an electrical braking system to apply a constant force without having to over-dimension the windings.

SUMMARY

To this end, an aspect of the present invention proposes a control method of an electrical braking system for aircraft comprising a plurality of electromechanical actuators capable of applying a braking force on friction members, each electromechanical actuator comprising an electric motor equipped with one or more windings, the braking system further comprising at least one power module configured to send to each electric motor winding a phase current and at least one control module configure to control, in response to a braking setpoint, the sending by the power module of a setpoint phase current determined depending on the braking force to be applied, wherein the method comprises at least one step consisting of varying the phase current transmitted to each winding of the electric motor so as to cause said phase current to oscillate around the setpoint phase current.

By thus causing the setpoint phase current to vary, the winding(s) of the motor of the actuator are no longer supplied with a continuous current, this even in the case of a braking setpoint corresponding to retention in a fixed position of the actuator with the application of a constant force. Consequently, the possible heating of the winding(s) remains very limited, which allows avoiding the over-dimensioning of the winding during the design of the electromechanical actuator. It is thus possible to design electrical braking systems having reduced mass and bulk.

According to a first feature of the method of the invention, the braking setpoint comprises a position setpoint of each electromechanical actuator, the variation of the phase current being accomplished by application of an oscillating movement around the position setpoint.

According to a second feature of the method of the invention, the braking setpoint comprises a force setpoint of each electromechanical actuator, the variation of the phase current being accomplished by application of an oscillating movement around the force setpoint of the actuator.

According to a third feature of the method of the invention, the variation of the phase current is accomplished by application of a modulation directly to the setpoint phase current.

According to a fourth feature of the method of the invention, the variation of the phase current transmitted to each winding of the electric motor is accomplished in response to a detection of a braking setpoint comprising a fixed position setpoint or a constant force setpoint. The modulation of the phase current is then applied only in the cases where the braking setpoint is likely to create heating in the winding(s) of the motor of the actuator.

According to another aspect of the invention, there is provided an electrical braking system for aircraft comprising a plurality of electromechanical actuators capable of applying a braking force on friction members, each electromechanical actuator comprising an electric motor equipped with one or more windings, the braking system further comprising at least one power module configured to send to each electric motor winding a phase current and at least one control module configured to control, in response to a braking setpoint, the sending by the power module of a setpoint phase current determined depending on the braking force to be applied, wherein the system comprises modulation means or modulation system configured to cause the phase current transmitted to each winding of the electric motor to vary so as to cause said phase current to oscillate around the setpoint phase current.

As for the method defined above, the electrical braking system of the invention allow avoiding feeding the winding(s) of the motor with a continuous current, this even in the case of a braking setpoint corresponding to holding the actuator in a fixed position with the application of a constant force. The possible heating of the winding(s) thus remains very limited, which allows designing electrical braking systems having reduced mass and bulk because there is no longer a need for over-dimensioning.

According to a first feature of the system of the invention, the braking setpoint comprises a position setpoint of each electromechanical actuator, the modulation system being configured to apply an oscillating movement around the position setpoint point.

According to a second feature of the system of the invention, the braking setpoint comprises a force setpoint of each electromechanical actuator, the modulation system being configured to apply an oscillating movement around the force setpoint of the actuator.

According to a third feature of the system of the invention, the modulation system is configured to apply a modulation directly to the setpoint phase current.

According to a fourth feature of the system of the invention, the modulation system is configured to cause the phase current transmitted to each winding of the electric motor to vary in response to a detection of a braking setpoint comprising a fixed position setpoint or a constant force setpoint.

BRIEF DESCRIPTION OF THE DRAWINGS

FIG. 1 is a functional schematic of an electrical braking system for aircraft according to one embodiment of the engine, FIG. 2 is a curve showing the position of a tappet of an electrical braking system during a fixed position setpoint and without application of variation of the setpoint phase current, FIG. 3 is a curve showing the phase current sent into the winding(s) of the motor of the tappet of FIG. 2, FIG. 4 is a curve showing the position of a tappet of an electrical braking system during a fixed position setpoint with application of an oscillating movement in conformity with the invention, FIG. 5 is a curve showing the phase current sent to the winding(s) of the motor of the tappet of FIG. 4.

DETAILED DESCRIPTION

FIG. 1 illustrates an electrical braking system 100 which comprises electromechanical brakes 50 (only one being shown in FIG. 1) each including a stack of disks 52 as friction members. The stack of disks 52 alternately includes disks integral in rotation with a wheel to be braked and disks fixed in rotation. Each electromechanical brake 50 further comprises a plurality of actuators 53 (only one is shown here) which are carried by a rim 54 to extend facing the stack of disks 52. Each actuator 53 includes a tappet 55 capable of being displaced toward the stack of disks 52 to press it and thus generate a braking force.

The tappet 55 is displaced by an electric motor of the actuator via a kinematic chain transforming a movement of rotation of the electric motor into a movement of translation of the tappet 55. The electric motor comprises one or more windings (not shown in FIG. 1) which are supplied by a controller 60 including a power module 63 which delivers phase currents $I_{PH}$ to the winding(s) of the motor of the actuator depending on an order 62 delivered by a control module 61.

The orders delivered by the control module 61 are elaborated based on different signals originating in particular from a braking computer 10, from a brake pedal 20 or from a parking selector 30.

The complete braking system of the aircraft can typically operate according to several modes, such as in particular a normal mode, an emergency mode and a parking mode.

For the sake of simplicity, only operation in normal mode will be described here, in which the control module 61 generates an order 62 depending on a braking setpoint 11 received from a braking computer 10. The braking setpoint 11 comprises a position setpoint of the motor of the actuator and a force setpoint of the actuator.

In conformity with the invention, the electrical braking system further comprises a modulation system configured to cause the phase current transmitted to each winding of the electric motor to vary, so as to cause said phase current to oscillate around the setpoint phase current, i.e. the current corresponding to the braking setpoint. The variation of amplitude of the alternating current signal created around the phase current is low in comparison to the value of the value of the setpoint phase current so as not to perturb the braking force controlled by the braking setpoint. Likewise, the frequency of the of the phase current thus modulated is selected so as to have a negligible effect from the braking point of view. The amplitude of the modulation around the braking setpoint is preferably on the order of 0.5%. The frequency of this modulation is preferably less than or equal to 1 Hertz. The modulation system includes electrical components to carry out the modulation.

According to a first feature of the system and of the method of the invention, the modulation of the phase current is accomplished by application of an oscillating movement around the position setpoint of the actuator. In the example described here, this modulation is accomplished by a module 40 which applies an oscillating movement around the position setpoint present in the braking setpoint 11.

FIGS. 2 and 3 illustrate respectively the position of the tappet and the phase current transmitted to the motor of an actuator like the actuator 53 described above, depending on a position setpoint, without the application of a modulation around the position setpoint. As can be observed, as soon as the setpoint position is reached by the tappet, the winding(s) of the motor are supplied with a large and continuous phase current, this during the entire period of immobilization in position of the motor. This causes considerable heating in the winding(s) of the motor due to the Joule effect losses.

FIGS. 4 and 5 illustrate respectively the position of the tappet and the phase current transmitted to the motor of an actuator like the actuator 53 described above depending on a position setpoint and with the application of a modulation around the position setpoint. In FIG. 4, it is seen that the position of the tappet oscillations around the setpoint position in response to the application of an oscillating movement on the position setpoint which can be accomplished for example by the module 40. This oscillation translates into a variation of the setpoint phase current sent to each winding of the motor as illustrated in FIG. 5. The winding(s) of the motor of the actuator are no longer supplied with current continuously during the duration of immobilization in position of the motor, which allows avoiding heating of the winding(s).

According to a second feature of the system and of the method of the invention, the modulation of the phase current is accomplished by the application of an oscillating movement around the force setpoint of the actuator. In the example described here, this modulation is accomplished by a module 70 which applies an oscillation movement around the force setpoint present in the braking setpoint 11.

As explained above for the position setpoint of the motor, as soon as the setpoint force which the actuator must apply on the stack of brake disks via the tappet is attained, the winding(s) of the motor are fed with a large and continuous phase current, this during the entire period of application of the force. This causes considerable heating in the winding(s) of the motor due to the Joule effect losses.

During the application of a modulation around the force setpoint, the force exerted by the tappet oscillates around the setpoint force in response to the application of an oscillating movement to the force setpoint which can be accomplished for example by the module 70. This oscillation translates into a variation of the phase current sent to each winding of the motor. The winding(s) of the motor of the actuator are not supplied with current continuously during the duration of immobilization in position of the motor, which allows avoiding heating of the winding(s).

According to a third feature of the system and of the method of the invention, the modulation of the phase current is accomplished by the application of a modulation directly to the setpoint phase current. This modulation can be accomplished by a module 80 which applies an oscillating current to the value of the setpoint phase current. The winding(s) of the motor of the actuator are no longer supplied with current continuously during the duration of immobilization in position of the motor, which allows avoiding heating of the winding(s).

Regarding the instants or event of triggering the modulation of the phase current by the application of an oscillating movement around the position setpoint of the actuator, or by application of an oscillating movement around the force setpoint of the actuator, or even by the application of modulation directly to the setpoint phase current as described above, at least two options are possible.

According to a first option, the modulation of the phase current is implemented for any non-zero braking setpoint, the modulation of the phase current then being applied constantly.

According to a second option, the variation of the phase current transmitted to each winding of the electric motor is accomplished in response to a detection of a braking setpoint comprising a fixed position setpoint or a constant force setpoint. The modulation means of the phase current are then configured to trigger the modulation upon detection of a fixed position setpoint or a constant force setpoint, the modulation of the phase current being applied only in cases of braking setpoints likely to cause heating in the winding(s) of the motor of the actuator.

The invention claimed is:

1. A control method for an electrical braking system for aircraft comprising a plurality of electromechanical actuators configured to apply a braking force on friction members, each electromechanical actuator comprising an electric motor equipped with one or more windings, the braking system further comprising at least one power module configured to send to each electric motor winding a phase current and at least one control module configured to control, in response to a braking setpoint received by the at least one control module, the sending by the power module of a setpoint phase current determined depending on the braking force to be applied by the electromechanical actuator, wherein the method comprises the variation of the phase current transmitted to each winding of the electric motor so as to cause said phase current to oscillate around the setpoint phase current.

2. The method according to claim 1, wherein the braking setpoint comprises a position setpoint of each electromechanical actuator and wherein the variation of the phase current is accomplished by application of an oscillating movement around the position setpoint.

3. The method according to claim 1, wherein the braking setpoint comprises a force setpoint of each electromechanical actuator and wherein the variation of the phase current is accomplished by application of an oscillating movement around the force setpoint of the actuator.

4. The method according to claim 1, wherein the variation of the phase current is accomplished by application of a modulation directly to the setpoint phase current.

5. The method according to claim 1, wherein the variation of the phase current transmitted to each winding of the electric motor is accomplished in response to a detection of a braking setpoint comprising a fixed position setpoint or a constant force setpoint.

6. An electrical braking system for aircraft comprising a plurality of electromechanical actuators configured to apply a braking force on friction members, each electromechanical actuator comprising an electric motor equipped with one or more windings, the braking system further comprising at least one power module configured to send to each electric motor winding a phase current and at least one control module configured to control, in response to a braking setpoint received by the at least one control module, the sending by the power module of a setpoint phase current determined depending on the braking force to be applied by the electromechanical actuator, wherein the system comprises a modulation system configured to cause the phase current transmitted to each winding of the electric motor to vary so as to cause said phase current to oscillate around the setpoint phase current.

7. The system according to claim 6, wherein the braking setpoint comprises a position setpoint of each electromechanical actuator and wherein the modulation system is configured to apply an oscillating movement around the setpoint position.

8. The system according to claim 6, wherein the braking setpoint comprises a force setpoint of each electromechanical actuator and wherein the modulation system is configured to apply an oscillating movement around the force setpoint of the actuator.

9. The system according to claim 6, wherein the modulation system is configured to apply a modulation directly to the setpoint phase current.

10. The system according to claim 6, wherein the modulation system is configured to cause the phase current transmitted to each winding of the electric motor to vary in response to a detection of a braking setpoint comprising a fixed position setpoint or a constant force setpoint.

* * * * *